United States Patent [19]
deNeuf et al.

[11] Patent Number: 5,227,951
[45] Date of Patent: Jul. 13, 1993

[54] COMPOSITE MULTILAYER CAPACITIVE DEVICE AND METHOD FOR FABRICATING THE SAME

[75] Inventors: Joel B. deNeuf, State College; Bruce E. Helms, Warrior's Mark, both of Pa.

[73] Assignee: Murata Erie North America, Inc., Smyrna, Ga.

[21] Appl. No.: 925,552

[22] Filed: Aug. 4, 1992

[51] Int. Cl.$^5$ .......................... H01G 7/00; H01G 4/12; H01L 27/02
[52] U.S. Cl. ..................... 361/321; 29/25.42; 257/528
[58] Field of Search ............... 29/25.42; 361/320, 321; 357/51; 338/195; 333/70; 264/61

[56] References Cited

U.S. PATENT DOCUMENTS

| | | | |
|---|---|---|---|
| 3,569,872 | 3/1971 | Berlin | 333/70 |
| 3,619,220 | 11/1971 | Maher | 264/61 X |
| 4,835,656 | 5/1989 | Kitahara et al. | 361/321 |
| 4,910,638 | 3/1990 | Berghout et al. | 361/321 |
| 4,953,273 | 9/1990 | Insetta et al. | 29/25.42 |
| 5,003,428 | 3/1991 | Shepherd | 361/321 |
| 5,027,253 | 6/1991 | Lauffer et al. | 361/321 |
| 5,034,709 | 7/1991 | Azumi et al. | 333/184 |
| 5,046,236 | 9/1991 | Wada et al. | 29/610.1 |
| 5,072,329 | 12/1991 | Galvagni | 361/321 |
| 5,159,524 | 10/1992 | Hasegawa et al. | 361/321 X |

FOREIGN PATENT DOCUMENTS

| | | | |
|---|---|---|---|
| 105837 | 12/1973 | Japan | 59/9 |
| 147266 | 11/1977 | Japan | 1/16 |
| 82430 | 6/1980 | Japan | 4/40 |
| 7332 | 1/1981 | Japan | 4/40 |
| 54029 | 5/1981 | Japan | 4/40 |
| 70637 | 6/1981 | Japan | 4/40 |
| 94032 | 7/1981 | Japan | 4/40 |
| 147424 | 11/1981 | Japan | 4/40 |
| 39426 | 3/1982 | Japan | 4/40 |
| 80829 | 5/1982 | Japan | 4/40 |
| 188820 | 11/1982 | Japan | 4/40 |
| 27302 | 2/1983 | Japan | . |
| 49430 | 4/1983 | Japan | 4/40 |
| 51439 | 4/1983 | Japan | 4/40 |
| 119624 | 7/1983 | Japan | 4/40 |
| 127634 | 8/1983 | Japan | 4/40 |
| 150825 | 10/1983 | Japan | 4/40 |
| 210612 | 12/1983 | Japan | 4/40 |
| 123333 | 8/1984 | Japan | 4/40 |
| 225509 | 12/1984 | Japan | 4/40 |
| 140714 | 7/1985 | Japan | 4/40 |
| 184728 | 11/1987 | Japan | 4/40 |
| 274702 | 11/1987 | Japan | . |
| 90113 | 4/1988 | Japan | 4/40 |
| 108622 | 7/1988 | Japan | 4/40 |

*Primary Examiner*—Donald Griffin
*Attorney, Agent, or Firm*—Hopkins & Thomas

[57] ABSTRACT

A composite multilayer capacitive device (10) has an in series resistance. A capacitor body (14) is defined by a plurality of interleaved first and second ceramic layers (21, 23) having respective first and second electrode patterns (22, 24) which establish a selectable capacitance. A first termination (16) is disposed at a first end of the capacitor body (14) and is connected to the first electrode patterns (22) of the first ceramic layers (21). A second termination (18) is disposed at a second end of the capacitor body (14) and is connected to the second electrode patterns (24) of the second ceramic layers (23) through a lateral resistive layer (12) which is transversely engaged with the second electrode patterns (24) of the second ceramic layers (23) and with the second termination (18). As a result, the lateral resistive layer (12) serves as an in series resistance between the first and second terminations (16, 18).

21 Claims, 4 Drawing Sheets

COMPOSITE MULTILAYER CAPACITIVE DEVICE AND METHOD FOR FABRICATING THE SAME

BACKGROUND OF THE INVENTION

Technical Field

The present invention generally relates to discrete electronic circuit elements, and more particularly, to a composite multilayer capacitive device fabricated via multilayer ceramic (MLC) technology.

Related Art

For many years, the fabrication of discrete electronic multilayer capacitors has remained much the same. Generally, layers of conductive metallic electrodes are interleaved with layers of a dielectric ceramic material to form the main capacitor body of a multilayer ceramic capacitor. A termination, or a conductive contact, is disposed at each end of the capacitor body. Moreover, each termination is connected to an exclusive set of alternate electrodes. In effect, the capacitor body responds like a group of capacitors connected in electrical parallel. The parallel connection is effectuated by the common termination interfacing alternate electrodes. The degree of capacitance achieved is a function of the number of interleaved layers, the geometric area and thickness of each layer, and the dielectric constant of the ceramic layers.

The historical fabrication of multilayer ceramic capacitors and some of the most recently developed methods for manufacturing the same are described in, for example, U.S. Pat. No. 5,046,236 to Wada et al. and U.S. Pat. No. 4,835,656 to Kitahara, both of which are incorporated herein by reference as if set forth in full hereinafter. In general, the fabrication of the capacitor body is a lamination process. A ceramic sheet is obtained in green form. A thick film of a metallic electrode paste is screen printed on the ceramic sheet. Next, the ceramic sheets are stacked, pressed, cut, and then sintered in a kiln. Finally, the terminations are disposed at each end of the capacitor body by a conventional dipping process wherein the capacitor body is dipped into a liquified metallic solution, such as silver, and then sintered in a kiln. Afterwards, the terminations may be plated by one or more other metallic layers, such as a nickel and/or tin plating layer, if desired.

To further enhance the quality of multilayer ceramic capacitors, U.S. Pat. No. 4,910,638 to Berghout et al. teaches the implementation of a conductive barrier layer between the capacitor body and the terminations so as to prevent undesirable diffusion of silver from the terminations into the electrodes. Furthermore, U.S. Pat. No. 5,072,329 to Galvagni describes a method for multilayer ceramic capacitor fabrication which results in a capacitor resistant to undesirable delamination.

Because multilayer ceramic technology is inexpensive and can be utilized easily for mass production, attempts have been made to incorporate other circuit elements with capacitors using the multilayer ceramic technology. In the art, inductors and capacitors have been laminated alternately to form a single composite device whereby a filter function (high frequency noise absorption function) is obtained. Another composite electronic component is described in U.S. Pat. No. 5,034,709 to Azumi et al. In Azumi, a varistor and filter function are implemented in a single composite electronic component using multilayer ceramic technology.

Oftentimes, a need exists in the electronic and computer fields for a series connection of a capacitor and resistor. A series connection of a capacitor and a resistor is required, for example, for matching bus impedances, for data bus terminators adapted to minimize reflections in computer architectures, for digital-to-analog (D/A) and analog-to-digital (A/D) interface circuits, and for central processing unit (CPU) circuits. However, to date, neither prominent researchers nor manufacturers in the art have developed or suggested a technique for fabricating a series connection of a capacitor and a resistor in a single composite electronic component using multilayer ceramic technology. It is known that some manufacturers have created a series connection between a capacitor and a resistor in a unitary device by fabricating a distinct resistor with two terminations adjacent to a distinct capacitor with two other terminations, and then the circuit elements are coupled via connecting a termination from each. Another known technique involves bonding a thick film resistor to an existing capacitor body. However, such configurations are undesirable in that they are costly, occupy valuable space, and can be unreliable due to the increased number of electrical connections (e.g., solder joints).

SUMMARY OF THE INVENTION

Broadly stated, the present invention teaches a composite multilayer capacitive device with a series resistance and a method for fabricating the same. In the novel device, a capacitor body is defined by a plurality of interleaved first and second ceramic layers having respective first and second electrode patterns which establish a selectable capacitance. A first termination is disposed at a first end of the capacitor body and is connected to the first electrode patterns of the first ceramic layers. A second termination is disposed at a second end of the capacitor body and is directly connected to the second electrode patterns of the second ceramic layers through a resistance means for establishing a selectable resistance in electrical series with the selectable capacitance.

In a first embodiment of the present invention, the resistance means comprises a lateral resistive layer which is transversely engaged with the first electrode patterns of the first ceramic layers and also with the first termination. In order to provide the electrical connection between the first electrode patterns and the lateral resistive layer, the first electrode patterns are configured in the form of a substantially rectangular configuration with a protruding interconnect element adapted to engage the lateral resistive layer at the edge of the first ceramic layers. Furthermore, the second electrode patterns are comprised of a substantially rectangular configuration having an edge engaged directly with the said first termination.

In a second embodiment of the present invention, the resistance means comprises a lateral resistive layer which is transversely engaged with the first electrode patterns and also with the first termination. Moreover, the first electrode patterns each have a substantially rectangular configuration having a protruding interconnect element adapted to engage the lateral resistive layer. However, in contrast to the first embodiment, the second electrode patterns of the second embodiment each comprise a substantially rectangular configuration having a protruding interconnect element adapted to engage a lateral conductive layer. In essence, the lateral conductive layer serves as an interface between the second termination and the second electrode patterns.

The present invention also provides a novel method for providing a series resistance in a composite multilayer capacitive device. The method comprises the following steps. First, a capacitor body is formed by interleaving first and second ceramic layers having respective first and second electrode patterns. A lateral resistive layer is then transversely engaged with the second ceramic layers so that the lateral resistive layer is in contact with the second electrode patterns. Next, a first termination is connected to the first electrode patterns of the first ceramic layers. Finally, a second termination is connected to the lateral resistive layer in order to thereby establish a connection between the second termination and the second electrode patterns of the second ceramic layers. In this regard, the formulation of the resistive layer or the geometric area of the lateral resistive layer may be selectively varied to thereby vary the series resistance exhibited between the first and second terminations.

Therefore, it is an object of the present invention to provide a composite multilayer capacitive device and method for providing a series resistance.

Another object of the present invention is to provide a composite multilayer capacitive device with a series resistance which is reliable in function, durable in structure, and efficient in operation.

Another object of the present invention is to provide a composite multilayer capacitive device with a series resistance which occupies very little space.

Another object of the present invention is to provide a composite multilayer capacitive device with a series resistance which is inexpensive and easy to manufacture.

Other objects, features, and advantages of the present invention will become apparent from the following description when considered in conjunction with the accompanying drawings.

BRIEF DESCRIPTION OF THE DRAWINGS

The present invention, as defined in the claims, can be better understood with reference to the following drawings. The drawings are not necessarily to scale, emphasis instead being placed upon clearly illustrating principles of the present invention.

DETAILED DESCRIPTION OF THE PREFERRED EMBODIMENTS

Figure 1:
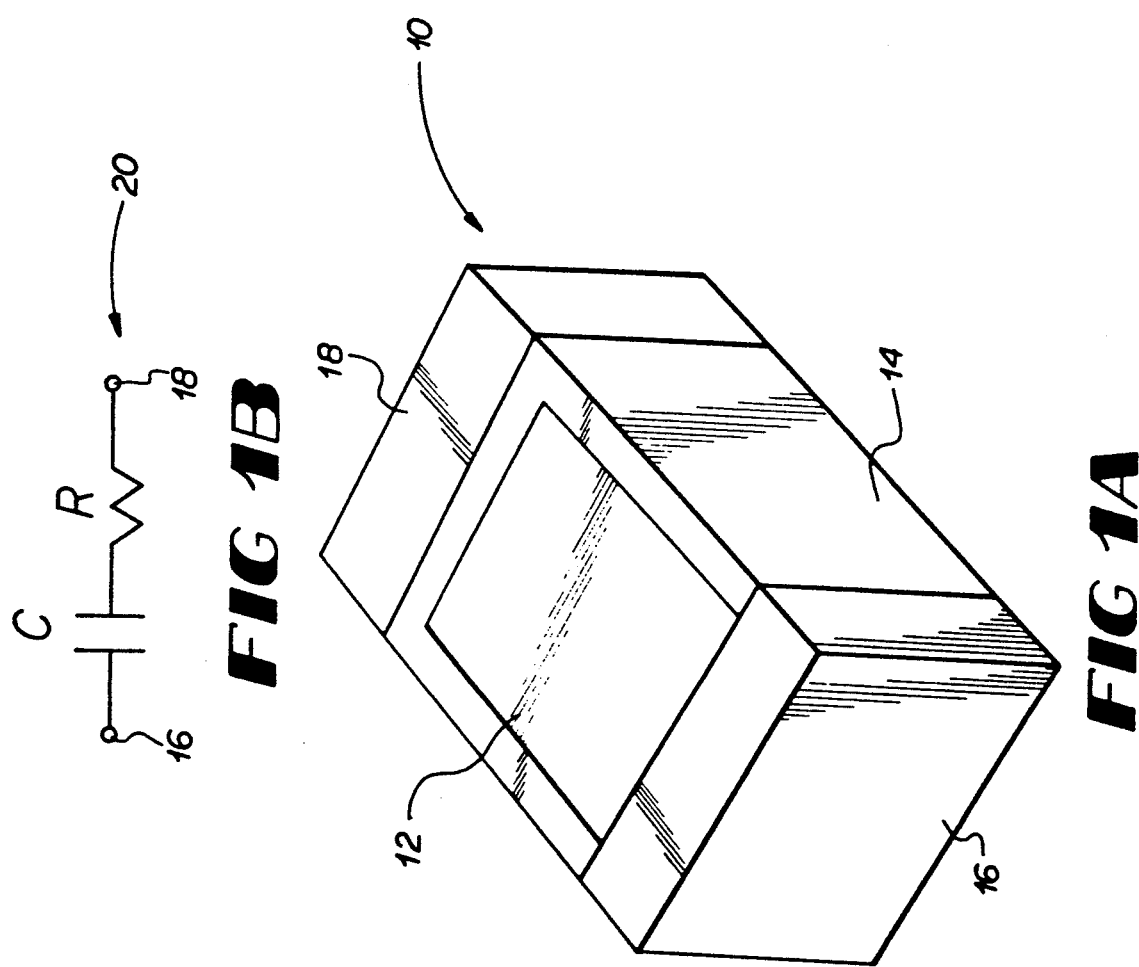
FIG. 1A is a perspective view of the present invention.
FIG. 1B is an electronic circuit model for the present invention of FIG. 1A.

A composite multilayer capacitive device 10 in accordance with the present invention is shown in FIG. 1A. As illustrated in FIG. 1A, a lateral resistive layer 12 is provided in combination with a capacitor body 14 between a termination 16 and a termination 18. The lateral resistive layer 12 is uniquely interfaced with internal electrode patterns of the capacitor body 14, which interfacing will be described in greater detail with respect to FIG. 2 hereinafter. Significantly, the composite multilayer capacitive device 10 exhibits the electrical characteristics as indicated by the electronic circuit model 20 of FIG 1B. The capacitor body 14 provides the series capacitance C, while the lateral resistive layer 12 provides the series resistance R.

The composite multilayer capacitive device 10 shown in FIG. 1A can be fabricated in many sizes. As a mere example, in one specific implementation, the composite multilayer capacitive device was fabricated to measure approximately 0.125×0.050×0.060 inches (i.e., industry standard 1206 body style). However, much smaller and much larger implementations are envisioned and are technically possible. Moreover, the composite multilayer capacitive device 10 can be inexpensively fabricated to provide capacitances in at least the range from about 0–1000 picofarads (pF) and resistances in at least the range from about 0–1 megohm, thereby making the device 10 desirable in a wide variety of electronic circuit applications. As with the size parameters, the foregoing capacitance and resistance ranges should not be construed as limiting the present invention, because much greater capacitances and resistances are technically possible and are envisioned.

Figure 2:
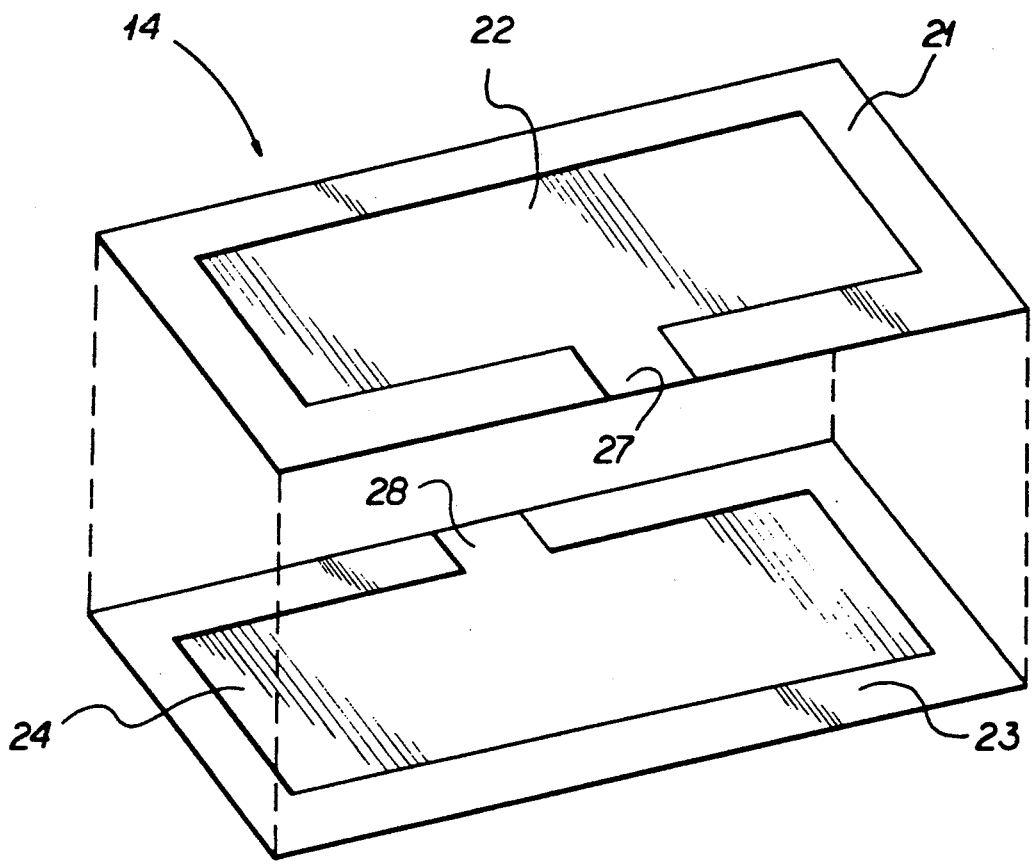
FIG. 2 is a perspective view showing interleaved electrode patterns in accordance with a first embodiment of the present invention.

The capacitor body 14 is defined by a plurality of interleaved first and second ceramic layers having respective first and second electrode patterns. FIG. 2 illustrates the interleaved electrode patterns in accordance with a first embodiment of the present invention. A first ceramic layer 21 has a first electrode pattern 22, comprising a suitable metal, metal alloy, or other conductor material. A second ceramic layer 23 has a second electrode pattern 24, comprising a suitable metal, metal alloy, or other conductor material. As shown by phantom lines, the first ceramic layer 21 and the second ceramic layer 23 are stacked and bonded together using conventional lamination techniques as discussed previously. Any number of first and second ceramic layers 21, 23 can be interleaved to derive virtually any desired capacitance. The degree of capacitance achieved is a function of (1) the number of interleaved ceramic layers 21, 23, (2) the geometric area and thickness of each electrode pattern 22, 24, and (3) the dielectric constant of the ceramic layers 21, 23.

In accordance with a significant aspect of the first embodiment, the first and second electrode patterns 22, 24 each comprise a substantially rectangular configuration having a respective protruding interconnect element 27, 28, one of which is adapted to physically engage the lateral resistive layer 12 of FIG. 1A to thereby establish an electrical connection therewith. The other protruding interconnect element 28, 27 physically engages a lateral conductive layer, discussed in more detail hereinafter, for establishing an electrical connection between the corresponding electrode pattern 24, 22 and one of the terminations 16, 18. As is obvious from FIG. 2, the first ceramic layer 21 having the first electrode pattern 22 can be manufactured substantially identical to the second ceramic layer 23 having the second electrode pattern 24 in order to enhance the cost effectiveness of the fabrication process for the capacitive device.

Figure 3:
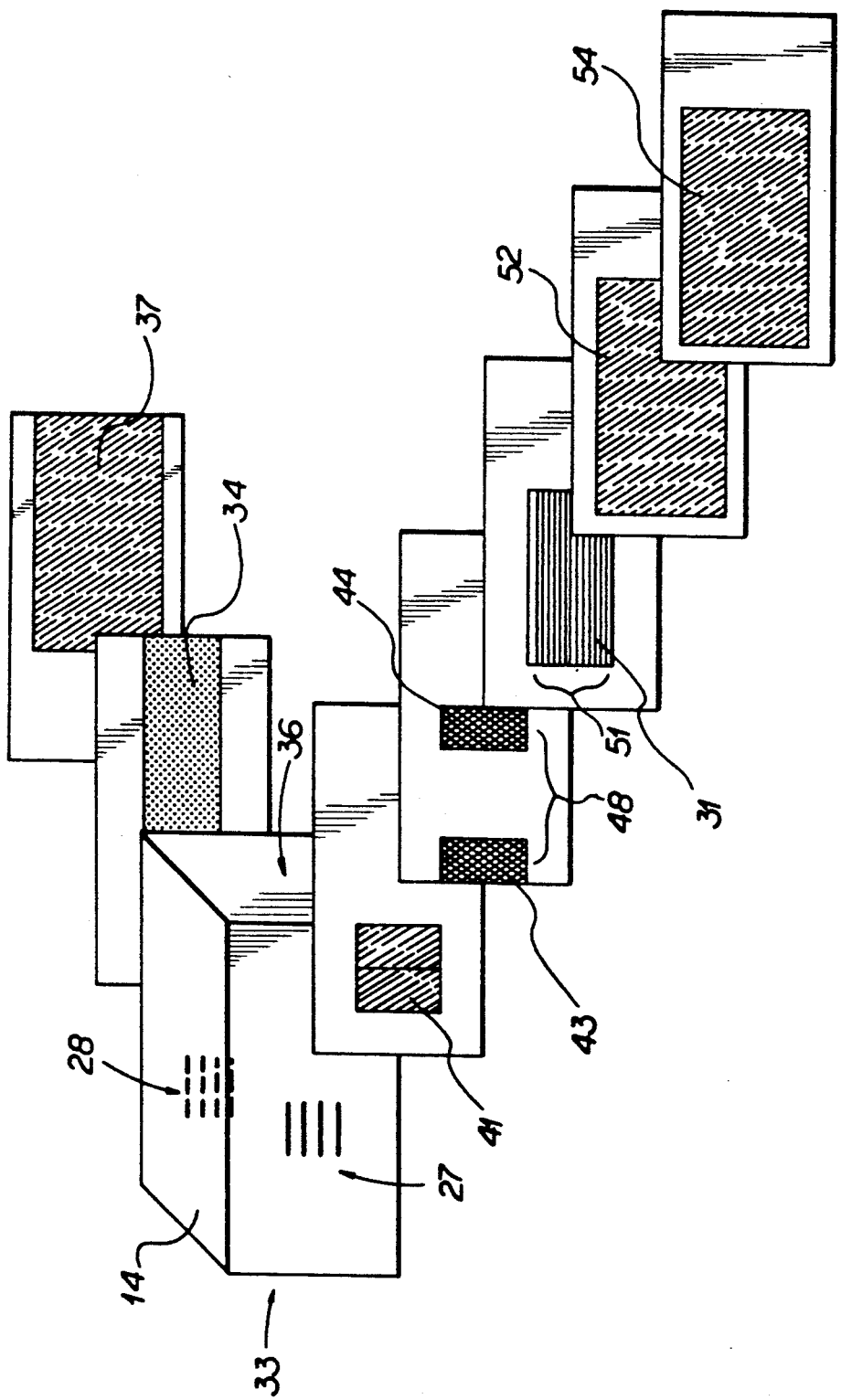
FIG. 3 is a perspective view of the lateral resistive layer and lateral conductive layer of the first embodiment.

After the capacitor body 14 has been fabricated, a series of layers are screen printed to two transverse surfaces of the capacitor body 14, as shown in FIG. 3.

Significantly, the protruding interconnect elements 27 of the capacitor body 14 are ultimately engaged with the lateral screened resistive layer 31 which establishes an electrical connection between the first electrode patterns 22 and the first termination 16 ultimately disposed at capacitor body end 33. Further, the protruding interconnect elements 28, shown by phantom lines, engage a lateral screened conductive layer 34 which establishes an electrical connection between the second electrode patterns 24 and the second termination 18 ultimately disposed at capacitor body end 36. The lateral conductive layer 34 is insulated by screening a dielectric outer layer 37, for example, glass ($SiCO_2$) or a similar insulating substance, over the lateral conductive layer 34.

In order to dispose the lateral resistive layer 31 on the capacitor body 14 to achieve the desired electrical configuration, a dielectric glaze pad 41 is positioned to cover the region between the capacitor body end 33 and the protruding interconnect elements 27. A conductive metallic material 43, 44 is then disposed at the ends of the dielectric glaze pad 41, as shown. The conductive metallic material 43 serves as an electrical interconnect between the first termination 16 and the lateral resistive layer 31. The conductive metallic material 44 serves as an electrical interconnect between the protruding interconnect elements 27 and the lateral resistive layer 31. Next, the lateral resistive layer 31 is positioned to cover the conductive metallic material 43, the dielectric glaze pad 41, and the conductive metallic material 44. Essentially, the dielectric glaze pad 41 insulates the lateral resistive layer 31 from the capacitor body 14 and prevents the resistive layer 31 from having an adverse diffusive reaction with the ceramic capacitor body 14.

In the preferred embodiments, the lateral resistive layer 31 is made of ruthenium oxide ($RuCO_2$) material, which is well known in the art. The series resistance R provided by the lateral resistive layer 31 is completely selectable. More specifically, the portion of the lateral resistive layer 31 which overlies the conductive metallic materials 3, 44 is essentially shorted out and consequently, contributes virtually nothing to the series resistance R. The ultimate series resistance R exhibited between the capacitor body faces 33, 36 is defined by (1) the gap 48 between the conductive metallic materials 43, 44, (2) the width 51 of the lateral resistive layer 31, (3) the thickness of the lateral resistive layer 31, and (4) the resistivity of the lateral resistive layer 31. All of the foregoing parameters may be manipulated to achieve virtually any desired series resistance R. Preferably, in order to manipulate the series resistance R, the physical parameters (i.e.. gap 48, width 51, resistance layer thickness) of the lateral resistive layer 31 remain fixed while the resistivity is manipulated b changing the formulation of the ruthenium oxide resistive material.

The lateral resistive layer 31 is insulated by superimposing, via preferably screening, two dielectric outer layers 52, 54. The dielectric outer layers 52, 54 are any suitable dielectric material, for example, glass or a similar insulating substance.

Finally, the terminations 16, 18 are disposed at the capacitor body faces 33, 36, respectively, via any conventional process. In the preferred embodiment, the terminations 16, 18 are applied through a dipping operation. Further, nickel plating and then tin plating is provided to enhance product durability in soldering operations.

Figure 4:
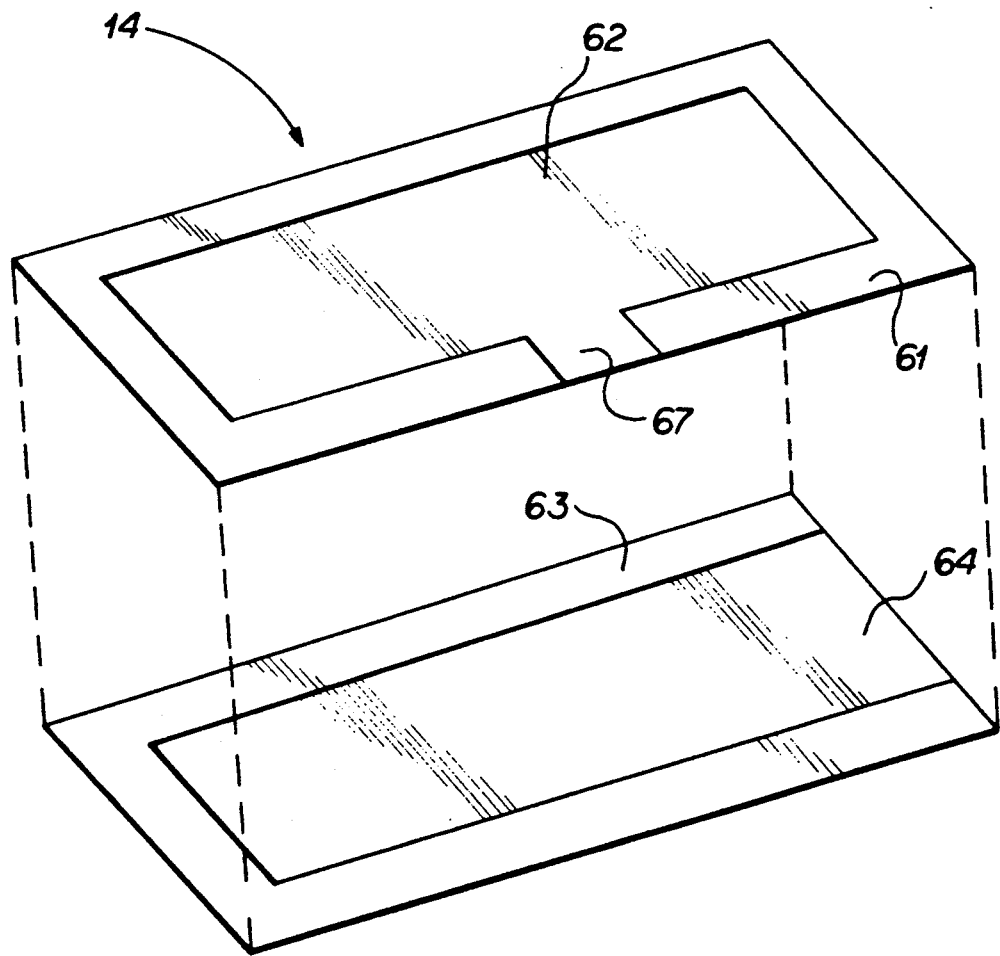
FIG. 4 is a perspective view showing the interleaved electrode patterns in accordance with a second embodiment of the present invention.

A second embodiment of the present invention requires interleaving different types of electrode patterns within the capacitor body 14, as illustrated in FIG. 4. Referring to FIG. 4, a first ceramic layer 61 having a first electrode pattern 62 with a protruding interconnect element 67 is interleaved with a second ceramic layer 63 having a second electrode pattern 64 with no protruding interconnect element. In accordance with the second embodiment, the second electrode pattern 64 is formed in a substantially rectangular configuration and is oriented on the ceramic layer 63 so that an edge of the second electrode pattern physically engages a termination 16, 18, thereby establishing an electrical connection therewith. The second embodiment eliminates the need of implementing the lateral conductive layer 34. However, the second embodiment may be more expensive to fabricate as a result of varying first and second electrode patterns 62, 64. In other words, the asymmetrical capacitor body configuration requires additional processing steps for orientation of the electrode patterns 62, 64 prior to screening operations.

It should be understood that many configurations and orientations for the electrode patterns 62, 64 are possible so long as the desired functionality is achieved. For example, the protruding interconnect element 67 could be positioned anywhere along the ceramic layer 61, and moreover, the protruding interconnect element 67 may take the form of a plurality of elements. As a further example, the electrode pattern 64 may be fabricated in the form of a plurality of strips, each having an edge for engaging the second termination 18.

It will be obvious to those skilled in the art that many variations may be made to the preferred embodiments described above without departing from the novel teachings of the present invention. All such variations are intended to be incorporated herein and within the scope of the following claims.

Wherefore, the inventors claim the following:

1. A composite multilayer capacitive device, comprising:
    a capacitor body defined by a plurality of interleaved first and second ceramic layers having respective first and second electrode patterns which establish a selectable capacitance;
    a first termination disposed at a first end of said capacitor body and connected to said first electrode patterns of said first ceramic layers;
    a second termination disposed at a second end of said capacitor body and connected to said second electrode patterns of said second ceramic layers; and
    a resistance means for establishing a selectable resistance in electrical series with said selectable capacitance between said first and second terminations.

2. The device of claim 1, wherein said resistance means comprises a lateral resistive layer which is transversely engaged with said first electrode patterns of said first ceramic layers and with said first termination and wherein said first electrode patterns each comprise a substantially rectangular configuration having a protruding interconnect element adapted to engage said lateral resistive layer.

3. The device of claim 1, wherein said first and second electrode patterns comprise respectively a first and second substantially rectangular configuration having a respective first and second protruding interconnect element, said first protruding interconnect element adapted to engage a lateral conductive layer engaged with said first termination, said second protruding interconnect element adapted to engage a lateral resistive layer.

4. The device of claim 3, wherein the capacitance exhibited between said first and second terminations measures between 0 and 1000 picofarads and said series resistance exhibited between said first and second terminations measures between 0 and 1 megohm.

5. The device of claim 1, wherein said resistance means comprises ruthenium oxide material.

6. The device of claim 1 measuring approximately 0.125×0.050×0.060 inches.

7. A composite multilayer capacitive device having a series resistance, comprising:
   a plurality of interleaved first and second ceramic layers having respective first and second electrode patterns;
   a first termination connected to said first electrode patterns of said first ceramic layers;
   a lateral resistive layer transversely engaged with said second electrode patterns of said second electrode layers; and
   a second termination connected via said lateral resistive layer to said second electrode patterns of said second ceramic layers.

8. The device of claim 7, wherein said second electrode patterns comprise a substantially rectangular configuration having a protruding interconnect element adapted to engage said lateral resistive layer.

9. The device of claim 8, wherein said first electrode patterns comprise a substantially rectangular configuration having an edge engaged with said first termination.

10. The device of claim 7, wherein said first and second electrode patterns comprise respectively a first and second substantially rectangular configuration having a respective first and second protruding interconnect element, said first protruding interconnect element adapted to engage a lateral conductive layer engaged with said first termination, said second protruding interconnect element adapted to engage said lateral resistive layer.

11. The device of claim 7, wherein the capacitance exhibited between said first and second terminations measures between 0 and 1000 picofarads and said series resistance exhibited between said first and second terminations measures between 0 and 1 megohm.

12. The device of claim 7, wherein said lateral resistance layer comprises ruthenium oxide material.

13. The device of claim 7 measuring approximately 0.125×0.050×0.060 inches.

14. A method for providing a series resistance in a composite multilayer capacitive device, comprising the steps of:
   forming a capacitor body by interleaving first and second ceramic layers having respective first and second electrode patterns;
   transversely engaging a lateral resistive layer to said second electrode patterns of said second ceramic layers;
   connecting a first termination to said first electrode patterns of said first ceramic layers; and
   connecting a second termination to said lateral resistive layer to thereby establish a connection between said second termination and said second electrode patterns of said second ceramic layers through said lateral resistive layer.

15. The method of claim 14, wherein said lateral resistive layer comprises ruthenium oxide material and further comprising the step of selectively varying the formulation of said ruthenium oxide material to thereby vary said series resistance.

16. The method of claim 14, further comprising the step of selectively varying the geometric area of said lateral resistive layer to thereby vary the series resistance exhibited between said first and second terminations.

17. The method of claim 14, further comprising the step of producing said first electrode pattern in the form of a substantially rectangular configuration and engaging an edge of said rectangular configuration with said first termination.

18. The method of claim 17, further comprising the steps of:
   producing said second electrode pattern in the form of a substantially rectangular configuration having a protruding interconnect element; and
   engaging said protruding interconnect element with said lateral resistive layer.

19. The method of claim 14, further comprising the steps of:
   producing said first and second electrode patterns in the form of substantially rectangular configurations having respective first and second protruding interconnect elements; and
   engaging a lateral conductive layer with said first protruding interconnect elements and with said first termination to thereby establish an electrical connection therebetween; and
   engaging said lateral resistive layer with said second protruding interconnect elements and with said second termination to thereby establish an electrical connection therebetween.

20. The method of claim 14, further comprising the steps of adjusting the capacitance exhibited between said first and second terminations so that said capacitance measures between 0 and 1000 picofarads and adjusting the series resistance exhibited between said first and second terminations so that said resistance measures between 0 and 1 megohm.

21. The method of claim 14, further comprising the step of fabricating said device so that said device measures approximately 0.125×0.050×0.060 inches.

* * * * *